United States Patent
Lui et al.

(10) Patent No.: US 7,529,323 B2
(45) Date of Patent: May 5, 2009

(54) QUATERNARY PRECODED CONTINUOUS PHASE MODULATION SOFT BIT METRIC DEMODULATOR

(75) Inventors: Gee L. Lui, Westminster, CA (US); Kuang Tsai, Santa Ana, CA (US)

(73) Assignee: The Aerospace Corporation, El Segundo, CA (US)

( * ) Notice: Subject to any disclaimer, the term of this patent is extended or adjusted under 35 U.S.C. 154(b) by 561 days.

(21) Appl. No.: 11/147,074

(22) Filed: Jun. 6, 2005

(65) Prior Publication Data
US 2006/0274862 A1    Dec. 7, 2006

(51) Int. Cl.
*H03D 1/00* (2006.01)
(52) U.S. Cl. .................. 375/341; 375/340; 375/350; 375/343; 375/316; 375/262; 714/794; 714/795
(58) Field of Classification Search .................. 375/341, 375/350, 284, 259, 326, 279, 340, 343, 316, 375/262
See application file for complete search history.

(56) References Cited

U.S. PATENT DOCUMENTS

| | | | | |
|---|---|---|---|---|
| 5,712,877 A | * | 1/1998 | Ho et al. ...................... | 375/284 |
| 6,148,040 A | * | 11/2000 | Nguyen et al. ............... | 375/326 |
| 6,320,914 B1 | * | 11/2001 | Dent ........................... | 375/302 |
| 6,389,574 B1 | * | 5/2002 | Belveze et al. ............... | 714/795 |
| 6,430,212 B1 | * | 8/2002 | Alisobhani et al. .......... | 375/141 |
| 7,072,414 B1 | * | 7/2006 | Lui et al. ..................... | 375/274 |
| 7,421,006 B2 | * | 9/2008 | Voglewede ................... | 375/132 |
| 2001/0019591 A1 | * | 9/2001 | Jafarkhani et al. .......... | 375/265 |
| 2005/0018794 A1 | * | 1/2005 | Tang et al. ................... | 375/341 |
| 2006/0088123 A1 | * | 4/2006 | Jensen et al. ................ | 375/295 |
| 2006/0171489 A1 | * | 8/2006 | Ghosh et al. ................ | 375/341 |
| 2006/0203943 A1 | * | 9/2006 | Scheim et al. ............... | 375/341 |
| 2007/0030926 A1 | * | 2/2007 | Brown et al. ................ | 375/340 |
| 2007/0098109 A1 | * | 5/2007 | Vadde et al. ................. | 375/297 |
| 2007/0177689 A1 | * | 8/2007 | Beadle et al. ................ | 375/279 |

* cited by examiner

*Primary Examiner*—Shuwang Liu
*Assistant Examiner*—Kenneth Lam
(74) *Attorney, Agent, or Firm*—Derrick Michael Reid

(57) ABSTRACT

A receiver generates log-likelihood-ratio-based soft bit metrics of precoded quaternary continuous phase modulation signals using four state-constrained trellises and a streamlined maximum likelihood sequence estimation Viterbi algorithm requiring no survivor state storage elements for a preferred error correction-coded quaternary Gaussian minimum shift keying communication system employing reduced-complexity pulse-amplitude modulation matched-filtering and soft-decision decoding.

12 Claims, 4 Drawing Sheets

PRECODED COHERENT GMSK COMMUNICATION SYSTEM

QUATERNARY SOFT BIT METRIC DEMODULATOR

MSB-1 CONSTRAINED TRELLIS

MSB-0 CONSTRAINED TRELLIS

LSB-1 CONSTRAINED TRELLIS

LSB-0 CONSTRAINED TRELLIS

CODED PERFORMANCE OF USING 3-FILTER QSBM DEMODULATOR
IN QUATERNARY GMSK WITH MODULATION INDEX 1/4

US 7,529,323 B2

QUATERNARY PRECODED CONTINUOUS PHASE MODULATION SOFT BIT METRIC DEMODULATOR

STATEMENT OF GOVERNMENT INTEREST

The invention was made with Government support under contract No. F04701-00-C-0009 by the Department of the Air Force. The Government has certain rights in the invention.

FIELD OF THE INVENTION

The invention relates to the field of continuous phase modulation communication systems. More particularly, the present invention relates to quaternary precoded continuous phase modulation and soft bit metric demodulation communication systems.

BACKGROUND OF THE INVENTION

Continuous phase modulation (CPM) signals are phase-modulated signals having a spectral occupancy that can be tailored to fit limited transmission bandwidth through suitable pre-modulation filtering. Moreover, unlike non-constant envelope signals such as amplitude-modulated signals or filtered phase-modulated signals, the CPM signals are of constant envelope and allow saturated power amplifier operation for maximum power efficiency. These desirable signal properties, fueled by the rising premium being placed on bandwidth and power efficiency, have resulted in CPM signals such as binary Gaussian Minimum Shift Keying (GMSK) being deployed in operational terrestrial and satellite communication systems. The ever-rising premium of bandwidth efficiency further motivates extending binary CPM to higher alphabet signaling format such as quaternary GMSK.

A quaternary CPM signal, despite its relatively poorer power performance than binary CPM, can be an attractive signaling format when used in conjunction with some forward error correction schemes. The use of soft-decision error correction decoding is particularly desirable in such a coded CPM communication system as it can significantly reduce the signal-to-noise ratio (SNR) needed for achieving an overall error rate performance. This SNR improvement, however, is predicated on the ability of the underlying demodulator to generate appropriate soft bit metrics for the soft-decision decoder. Conventional quaternary CPM signal demodulator produces hard decisions on symbols, hence on bits, by applying the maximum likelihood sequence estimation (MLSE) Viterbi algorithm and identify the most probable symbol sequences. Using such a hard-decision symbol demodulator in a coded quaternary CPM communication system brings only sub-optimal performance as only hard-decision error correction decoding is permissible.

Mengali taught reduced-complexity quaternary CPM demodulator based upon the pulse-amplitude modulation (PAM) components of the complex envelope of a quaternary CPM signal as an extension of the PAM-based reduced-complexity receiver originally proposed by Kaleh for demodulating binary CPM signals. The design principle of such a reduced-complexity quaternary CPM demodulator is footed on a bank of matched-filters associated with the PAM components of the underlying CPM signal. The complexity reduction is achieved by using only a subset of the PAM matched-filters in the receiver. The total number of PAM components in a quaternary CPM signal is equal to $3 \cdot 4^{(L-1)}$ where L represents the memory of the CPM pre-modulation filter. The memory length L is generally in the order of the reciprocal of the bandwidth-time product BT, that is, $L=1/BT$. Typically, for moderate bandwidth-time product BT, only a small subset of these PAM components needs to be considered for demodulation purpose. For example, with $BT=1/3$, only the first three energy-dominate PAM components in the quaternary GMSK signal need to be considered out of a total of forty-eight PAM components, and hence, only three respective matched-filters are used for demodulation. Following Kaleh's work on demodulating binary CPM signals, Mengali taught hard-decision quaternary symbol demodulation using MLSE Viterbi algorithm. However, both Mangali and Kaleh have failed to construct an appropriate soft bit metric using the theoretical log-likelihood ratios and as such are less than optimal in performance. Additionally, Mangali and Kaleh taught hard-decision symbol demodulation requiring extensive memory elements for storing the survivor path states when implementing the MLSE Viterbi algorithm. These and other disadvantages are solved or reduced using the invention.

SUMMARY OF THE INVENTION

An object of the invention is to provide a soft bit metric demodulator that generates log-likelihood ratios.

Another object of the invention is to provide a soft bit metric demodulator that generates log-likelihood ratios for demodulating quaternary continuous phase modulated (CPM) signals.

Yet another object of the invention is to provide a soft bit metric demodulator that generates log-likelihood ratios for demodulating quaternary CPM signals using a maximum likelihood sequence estimation (MLSE) Viterbi algorithm.

Still another object of the invention is to provide a soft bit metric demodulator for demodulating quaternary CPM signals using a MLSE Viterbi algorithm where the soft metrics are log-likelihood ratios.

The invention is directed to a soft bit metric demodulator that utilizes the maximum likelihood sequence estimation (MLSE) Viterbi algorithm to generate log-likelihood ratios. The demodulator can be used for demodulating precoded quaternary Gaussian minimum shift keying (GMSK) signals and, more generally, for demodulating precoded quaternary continuous phase modulation (CPM) signals. This quaternary soft bit metric (QSBM) demodulator is implemented as a streamlined MLSE Viterbi algorithm that requires no memory elements for storing the survivor path states. In the preferred GMSK form, the bandwidth-time product of the Gaussian pre-modulation shaping filter is $BT=1/3$, the modulation index is $h=1/4$, and the receiver uses three matched-filters. The QSBM demodulator can be used either in a stand-alone un-coded CPM system, or in a coded CPM system in conjunction with some forward-error-correction scheme such as the classical rate-1/2 convolution code with maximum likelihood Viterbi decoding. The QSBM demodulator permits soft-decision decoding in coded quaternary CPM communication systems by generating the log-likelihood ratios for the bits associated with the quaternary data symbols received over a noisy channel. In a typical rate-1/2 convolutional-coded quaternary GMSK system, the QSBM demodulator is able to provide an improvement of about 3.0 dB SNR over hard-decision error-correction decoding without the use of memory elements for storing the survivor path states.

These and other advantages will become more apparent from the following detailed description of the preferred embodiment.

DETAILED DESCRIPTION OF THE PREFERRED EMBODIMENTS

Figure 1:
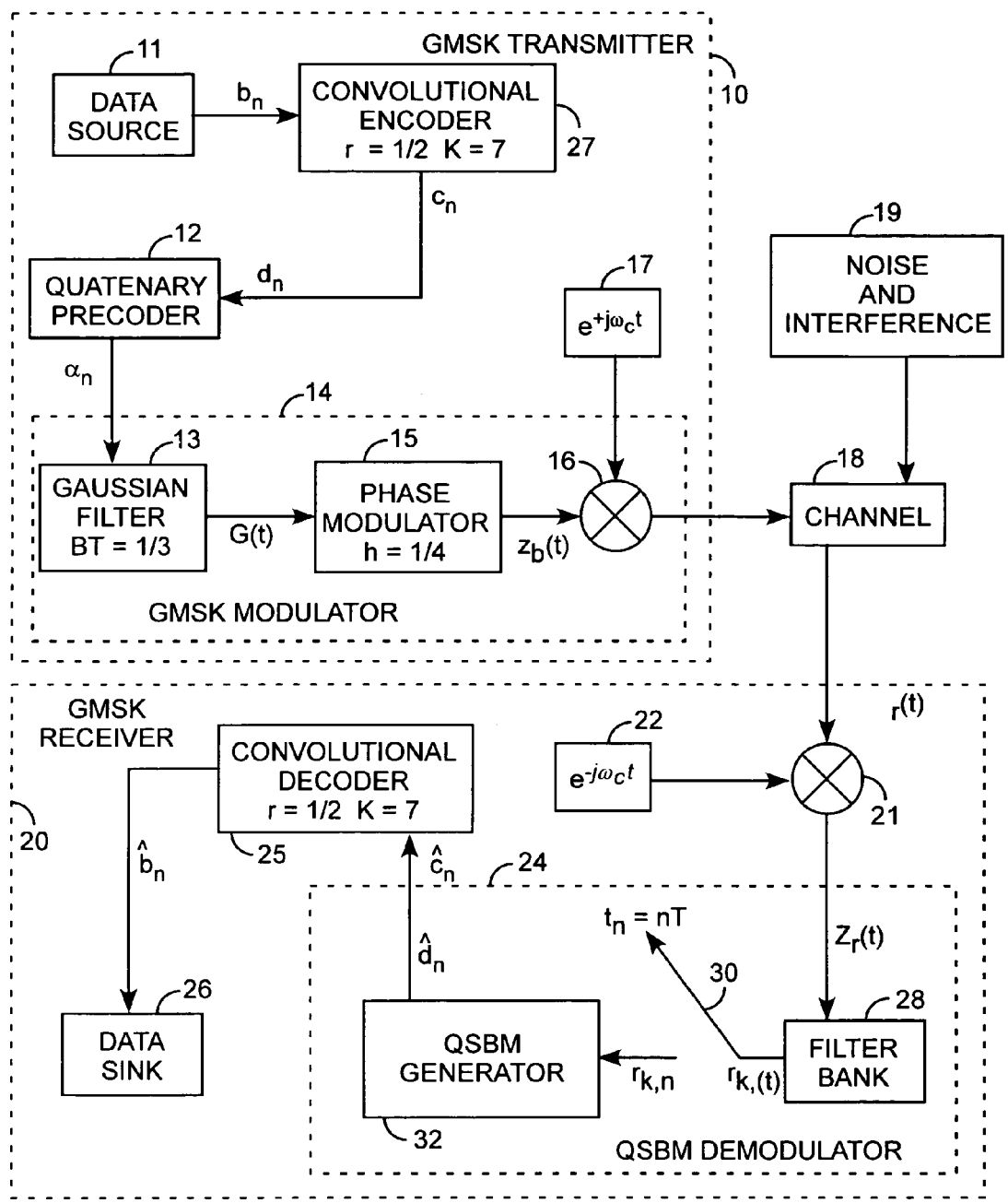
FIG. 1 is a block diagram of a precoded quaternary Gaussian minimum shift keying (GMSK) communication system having convolutional encoding, quaternary data preceding, and continuous phase modulation (CPM) in a GMSK transmitter, and having a quaternary soft bit metric (QSBM) demodulator in a GMSK receiver.

An embodiment of the invention is described with reference to the figures using reference designations as shown in the figures. Referring to FIG. 1, a quaternary GMSK transmitter 10 comprises a binary data source 11, a convolutional encoder 27, a quaternary data precoder 12, and a GMSK modulator 14. The binary data source 11 continuously generates binary data bits $b_n$ that are in turn convolutional-encoded into binary coded bits $c_n$. The stream of binary coded bits is equivalently viewed, two coded bits at a time, as a stream of quaternary NRZ data symbols $d_n$ chosen from an quaternary alphabet set $\{\pm 1, \pm 3\}$. The mapping from two binary coded bits $c_{2n}$ and $c_{2n+1}$ to one quaternary NRZ symbol $d_n$ may be, for example, $d_n=(1-2c_{2n})\cdot(1+2c_{2n+1})$. The stream of quaternary NRZ source symbols $d_n$ are then precoded by the quaternary data precoder 12 into quaternary precoded symbols $\alpha_n \in \{\pm 1, \pm 3\}$ that are in turn modulated by the GMSK modulator 14. The GMSK modulator 14 includes a Gaussian filter 13, a frequency modulator 15 with modulation index h, and a frequency converter 16 for upconverting the baseband signal $z_b(t)$ using a local oscillator 17. The Gaussian filter 13 is defined by a bandwidth-time product (BT) that may be, for example, 1/3, where B is the one-sided 3 dB bandwidth in hertz of the Gaussian filter 13 and T is the quaternary channel symbol duration in seconds. For M-ary GMSK signals, both the main lobe bandwidth and the side-lobe amplitude decrease with a decreasing BT. The Gaussian filter 13 produces an output G(t) that is the cumulative sum of pulse responses resulting from the input quaternary precoded symbols $\alpha_n$, that is, $G(t)=\Sigma \alpha_n f(t-nT)$. The individual pulse response f(t), also known as the GMSK frequency pulse, depends on the BT product and is essentially zero except over a time interval of duration LT, where L is an integer representing the memory of the Gaussian filter 13. The memory length L, generally on the order of $(BT)^{-1}$, is an integer greater than or equal to one. The frequency modulator 15 receives and frequency-modulates the Gaussian filter output G(t) by a predetermined modulation index h that may be, for example, 1/4. In general, lowering the modulation index h while keeping the BT product constant will further reduce the spectral occupancy of the M-ary GMSK signal. Preferably, the modulation index is set to h=1/M in order to facilitate M-ary data precoding. The frequency modulator 15 transforms the Gaussian filter output G(t) into a baseband GMSK signal $z_b(t)$ with a constant envelope of $A=\sqrt{(2E/T)}$, that is, $z_b(t)=A\cdot\exp[j\pi h\cdot\Sigma\alpha_n g(t-nT)]$ where E denotes the data symbol energy. The function g(t), defined as the integral of the GMSK frequency pulse f(t), is the well-known GMSK phase pulse satisfying a boundary condition of g(LT)=1. The baseband GMSK signal $z_b(t)$ is then upconverted by the converter 16 using the carrier reference 17 and then transmitted over a communication channel 18 subject to additive white Gaussian noise (AWGN) and potential interference 19. A quaternary GMSK receiver 20 equipped with a frequency downconverter 21 receives the transmitted GMSK signal, along with noise and interference. The downconverter 21 uses a locally generated carrier reference 22 to downconvert the received RF signal into a baseband signal $z_r(t)$. The received baseband signal $z_r(t)$ is then processed by a quaternary soft bit metric (QSBM) demodulator 24 to provide quaternary data estimates $\hat{d}_n$ to a convolutional decoder 25 that matches the convolutional encoder 27 used in the transmitter 10. The convolutional decoder 25 views each quaternary data estimate $\hat{d}_n$ as a pair of binary coded bit estimates and produces a continuous stream of decoded bit estimates $\hat{b}_n$ that is fed into a binary data sink 26. The QSBM demodulator 24 includes a filter bank 28, a sampler 30 operating at symbol rate, and a QSBM generator 32 generating the pair of binary coded bit estimates that constitute the quaternary data estimate $\hat{d}_n$.

Figure 2:
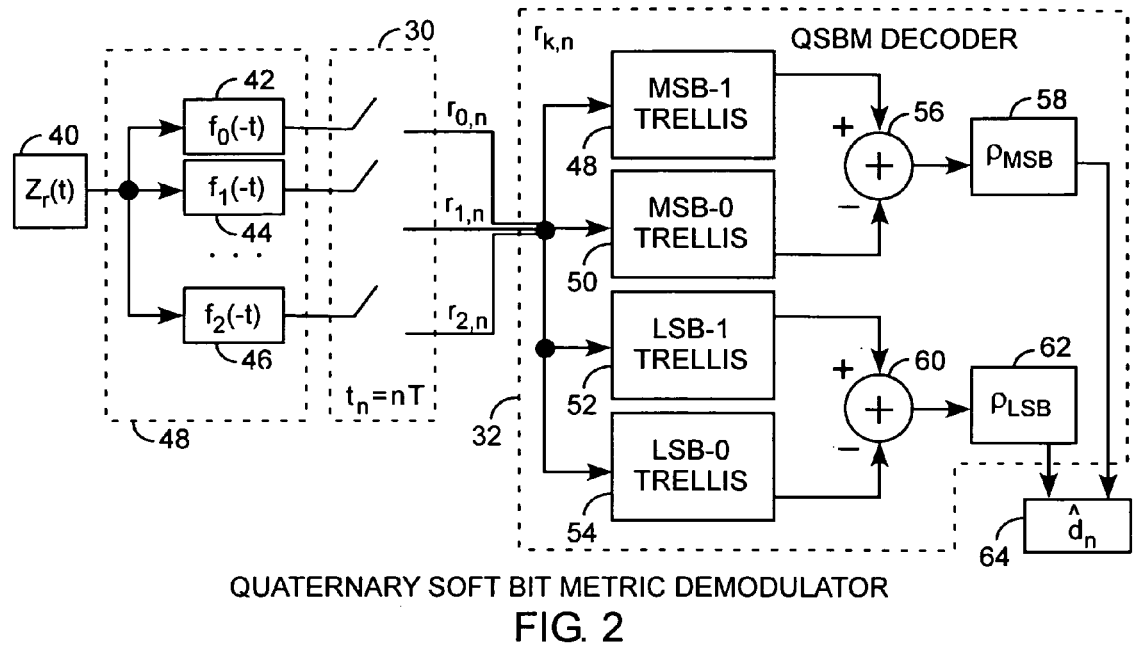
FIG. 2 is a block diagram detailing the processing structure of the QSBM demodulator.
Figure 3A:
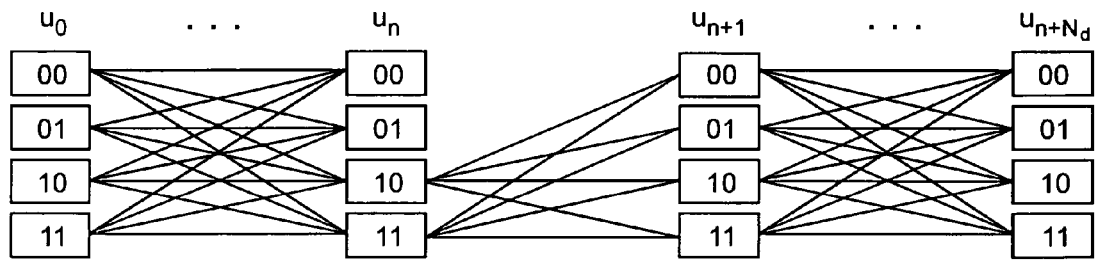
FIG. 3A depicts a constrained trellis wherein the most significant bit is restricted to a 1 (MSB-1).
Figure 3B:
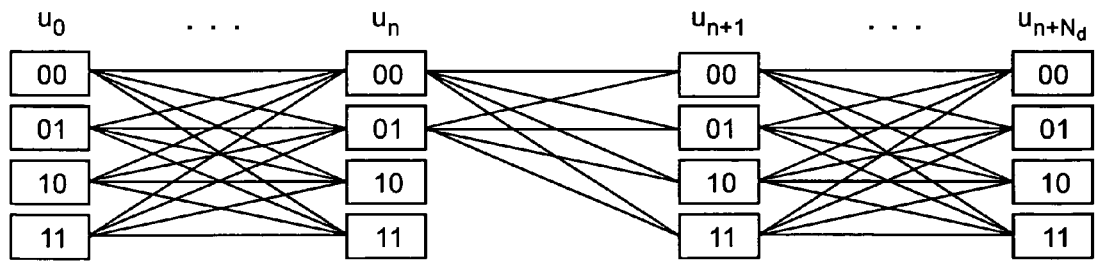
FIG. 3B depicts a constrained trellis wherein the most significant bit is restricted to a 0 (MSB-0).
Figure 3C:
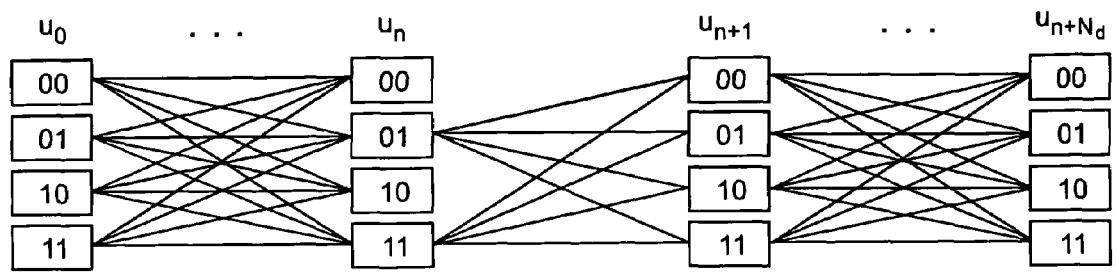
FIG. 3C depicts a constrained trellis wherein the least significant bit is restricted to a 1 (LSB-1).
Figure 3D:
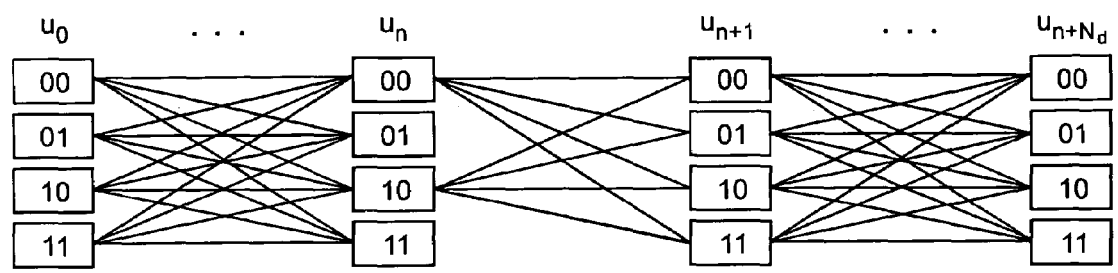
FIG. 3D depicts a constrained trellis wherein the least significant bit is restricted to a 0 (LSB-0).

Referring to FIGS. 1, 2, 3A, 3B, 3C, and 3D, and more particularly to FIG. 2, the received baseband signal $z_r(t)$ is first filtered by the filter bank 28 consisting of at most F matched filters, where $F=3\cdot 4^{(L-1)}$ corresponds to the total number of PAM components in the quaternary GMSK signal. The filter bank 28 may be implemented as a matched filter bank or as an integrate-and-dump filter bank. As taught by Mengali, the transmitted quaternary GMSK baseband signal $z_b(t)$ for an N-symbol long quaternary data sequence $\{\alpha_n; 0 \leq n \leq N-1\}$ has a quaternary PAM representation given by a $z_b(t)$ output equation.

$$z_b(t) = A \cdot \exp\left(j\pi h \sum_{n=0}^{N-1} \alpha_n \cdot g(t-nT)\right) = A \cdot \sum_{k=0}^{F-1} \sum_{n=0}^{N-1} b_{k,n} \cdot f_k(t-nT)$$

In the $z_b(t)$ output equation, $\{b_{k,n}\}$, known as the quaternary pseudo-symbols, are functions of the modulator input symbols $\{\alpha_n\} \subset \{\pm 1, \pm 3\}$, and $\{f_k(t)\}$, known as the quaternary PAM components, are explicitly defined in terms of the $2^{(L-1)}$ binary PAM components originally taught by Kaleh. The filter bank 28 provides filtered signals $r_k(t)$ for $0 \leq k \leq F-1$, that are sampled by the sampler 30 at every symbol time boundaries $t_n=nT$ to produce discrete sample values $r_{k,n}$. These discrete sample values are then processed by the QSBM generator 32 to provide the data estimates $\hat{d}_n$ to the convolutional decoder 25. In order to produce reliable data estimates $\hat{d}_n$ the processing of the QSBM generator 32 must conform to the preceding performed by the quaternary precoder 12 on the source data symbols $d_n$ in the transmitter 10. The number of matched filters used in the filter bank 28 also dictates the exact processing structure of the QSBM generator 32. For complexity reduction consideration, only the three most energy-dominant PAM components in the transmitted quaternary GMSK baseband signal $z_b(t)$ are considered when instituting the filter bank 28. In this preferred form, the filter bank 28 consists of exactly three matched filters, that is, $f_0(-t)$, $f_1(-t)$ and $f_2(-t)$. The impulse response of these matched filters are time-reversibly related to the corresponding quaternary PAM components explicitly given by $f_0(t)=h_0(t,h)h_0(t,2h)$, $f_1(t)=h_0(t+T,h)h_0(t,2h)$, and $f_2(t)=h_0(t,h)h_0(t+T, 2h)$ in terms of the dominant binary PAM component $$h_0(t, a) = \prod_{i=0}^{L} c(t - iT, a)$$

where $c(t,a)=\sin(\pi a - \pi a g(|t|)/\sin(\pi a)$ for $|t| \leq LT$ and $c(t,a)=0$ for $|t| \geq LT$. The filtered signals $r_0(t)$, $r_1(t)$ and $r_2(t)$ are sampled by the sampler 30 and concurrently fed into the QSBM generator 32 as sampled inputs $r_{0,n}$, $r_{1,n}$ and $r_{2,n}$. In the preferred three-filter form, the sampled inputs $r_{k,n}$, $k \in \{0,1,2\}$, are fed into a most-significant-bit-1 (MSB-1) trellis 48 shown in FIG. 3A, a most-significant-bit-0 (MSB-0) trellis 50 shown in FIG. 3B, a least-significant-bit-1 (LSB-1) trellis 52 shown in FIG. 3C, and a least-significant-bit-0 (LSB-0) trellis 54 shown in FIG. 3D. As we shall soon explain in detail, the trellises 48, 50, 52, and 54 are four-state constrained trellises, in that, either the MSB or the LSB of a quaternary state symbol $u_n$ is restricted to take on a value of either 1 or 0. While the outputs of the MSB-constrained trellises 48 and 50 are subtracted at an adder 56 to form a $\rho_{MSB}$ bit-metric stream 58, the outputs of the LSB-constrained trellises 52 and 54 are subtracted at another adder 60 to form a $\rho_{LSB}$ bit-metric stream 62. The two bit-metric streams $\rho_{MSB}$ and $\rho_{LSB}$, together constituting a single stream of quaternary data estimates $\hat{d}_n$, provide alternating soft bit metrics to the convolutional decoder 25.

The quaternary pseudo-symbols $\{b_{k,n}\}$ in the quaternary PAM representation of $z_b(t)$ are related to the modulator input data symbols $\{\alpha_n\} \subset \{\pm 1, \pm 3\}$ in such a manner that necessitates a differential decoding step when demodulating the CPM signal. The purpose of the quaternary data precoder 12 is to encode the source symbols $\{d_n\} \subset \{\pm 1, \pm 3\}$ prior to the GMSK modulator 14 so that the resulting pseudo-symbols are directly related to the source symbols $\{d_n\}$, thus avoiding the differential decoding step and improves demodulation performance in noise. Such a preceding scheme is achievable for all quaternary CPM signals generated using s frequency modulator 15 with modulation index $h=1/4$. This quaternary data precoding scheme is given by $\alpha_n = [d_n - d_{n-1} + 1]_{mod8}$ ($n \geq 0$, $d_{-1}=1$) where $[i]_{mod8}$ denotes a modified modulo-8 operation on integer i for which $|[i]_{mod8}| < 4$ is always maintained. With such a quaternary data precoding scheme applied in the preferred three-filter receiver form, the resulting three pseudo-symbols at any time $t=nT$ involve only the two most recent source symbols $\{d_n, d_{n-1}\}$ by quaternary pseudo-symbol equations.

$$b_{0,n} = J^n \cdot J^{d_n}$$

$$b_{1,n} = J^{n-1} \cdot J^{d_{n-1} + 2\alpha_n^{(1)}}$$

$$b_{2,n} = J^{n-1} \cdot J^{d_{n-1} + \alpha_n^{(0)}}$$

In the pseudo-symbol equations, $J = \exp(j\pi h) = (1+j)/\sqrt{2}$ and $\{\alpha_n^{(0)}, \alpha_n^{(1)}\} \subset \{\pm 1\}$ are the constituent binary symbols uniquely associated with the precoded quaternary symbol $\alpha_n$ through $\alpha_n = \alpha_n^{(0)} + 2\alpha_n^{(1)}$. These precoded pseudo-symbols allow us to construct a four-state trellis, where the trellis state $u_n = a_{1,n} a_{2,n} \in \{00, 01, 10, 11\}$ at time $t=nT$ is defined as the two-bit pattern associated with the quaternary source symbol $d_n$ at time $t=nT$, and apply the conventional MLSE Viterbi algorithm to identify the surviving state sequence and decide on the corresponding source symbol sequence. The branch metric $u_n$, $0 \leq n \leq N-1$, needed for exercising this MLSE Viterbi algorithm in the preferred three-filter receiver is given by $\text{Re}(r_{0,n} \cdot b^*_{0,n} + r_{1,n} \cdot b^*_{1,n} + r_{2,n} \cdot b^*_{2,n})$. As mentioned earlier, because the MLSE Viterbi algorithm only produces sequence of estimated symbols, hence estimated bits, only hard-decision decoding is possible when this conventional MLSE demodulator is used in a coded quaternary CPM communication system.

In contrast to the conventional MLSE Viterbi algorithm, the QSBM generator 32 is specifically devised to permit soft-decision decoding in a coded quaternary CPM communication system. With $\underline{u} = (u_0, u_1, u_2, \ldots, u_{N-1})$ denoting the equally probable quaternary source symbol sequence of length N, where $u_k = a_{1,k} a_{2,k} \in \{00, 01, 10, 11\}$ and $a_{1,k}$, $a_{2,k}$ are, respectively, the most significant bit (MSB) and the least significant bit (LSB) of the $k^{th}$ source symbol $u_k$. With $s(t, \underline{u})$ denoting the transmitted GMSK waveform, and with $r(t) = s(t, \underline{u}) + n(t)$ denoting the corresponding RF waveform received over an AWGN channel with one-sided spectral density $N_0/2$. The optimum soft bit metrics $\lambda_{1,k}$ and $\lambda_{2,k}$ for bits $a_{1,k}$ and $a_{2,k}$ of the $k^{th}$ quaternary source symbol $u_k$ of the transmitted N-symbol sequence $\underline{u}$ can be expressed as the log-likelihood ratios (LLR) as described in the following two LLR equations.

$$\lambda_{1,k} = \ln \left( \frac{Pr(u_k = 10 \mid r(t), 0 \leq t \leq NT) + Pr(u_k = 11 \mid r(t), 0 \leq t \leq NT)}{Pr(u_k = 00 \mid r(t), 0 \leq t \leq NT) + Pr(u_k = 01 \mid r(t), 0 \leq t \leq NT)} \right)$$

$$= \ln \left( \frac{\sum_{\underline{u}} \exp\left(\frac{2}{N_0} \int_0^{NT} r(t) s(t, \underline{u}, u_k = 10) dt\right) + \exp\left(\frac{2}{N_0} \int_0^{NT} r(t) s(t, \underline{u}, u_k = 11) dt\right)}{\sum_{\underline{u}} \exp\left(\frac{2}{N_0} \int_0^{NT} r(t) s(t, \underline{u}, u_k = 00) dt\right) + \exp\left(\frac{2}{N_0} \int_0^{NT} r(t) s(t, \underline{u}, u_k = 01) dt\right)} \right)$$

$$\lambda_{1,k} = \ln \left( \frac{Pr(u_k = 10 \mid r(t), 0 \leq t \leq NT) + Pr(u_k = 11 \mid r(t), 0 \leq t \leq NT)}{Pr(u_k = 00 \mid r(t), 0 \leq t \leq NT) + Pr(u_k = 01 \mid r(t), 0 \leq t \leq NT)} \right)$$

$$= \ln \left( \frac{\sum_{\underline{u}} \exp\left(\frac{2}{N_0} \int_0^{NT} r(t) s(t, \underline{u}, u_k = 10) dt\right) + \exp\left(\frac{2}{N_0} \int_0^{NT} r(t) s(t, \underline{u}, u_k = 11) dt\right)}{\sum_{\underline{u}} \exp\left(\frac{2}{N_0} \int_0^{NT} r(t) s(t, \underline{u}, u_k = 00) dt\right) + \exp\left(\frac{2}{N_0} \int_0^{NT} r(t) s(t, \underline{u}, u_k = 01) dt\right)} \right)$$

In the LLR equations, the expression $s(t, \underline{u}, u_k = a_{1,k} a_{2,k})$ denotes the waveform corresponding to an N-symbol quaternary sequence $\underline{u}$ for which the MSB and LSB of the $k^{th}$ quaternary symbol $u_k$ is $a_{1,k}$ and $a_{2,k}$, respectively. As is apparent from the LLR equations, the optimum soft bit metrics $\lambda_{1,k}$ and $\lambda_{2,k}$ are impractical to implement because its computational complexity grows exponentially with sequence length N. Moreover, the LLR computations require the evaluation of nonlinear functions as well as the knowledge of $N_0$, which may be difficult to ascertain in practice. To circumvent these implementation difficulties, simpler approximations to these LLR expressions can be used. Specifically, the numerator sum and denominator sum of both LLR expressions are approximated by their respective maximum terms. Upon replacing these sums with the respective maximum terms and omitting the constant factor $(2/N_0)$, the following two approximate LLR equations are obtained.

$$\rho_{1,k} = \int_0^{NT} r(t)s\big(t, \underline{u}^{(i_1)}, u_k = 1a_{2,k}^{(i_1)}\big)dt - \int_0^{NT} r(t)s\big(t, \underline{u}^{(j_1)}, u_k = 0a_{2,k}^{(j_1)}\big)dt$$

$$\rho_{2,k} = \int_0^{NT} r(t)s\big(t, \underline{u}^{(i_2)}, u_k = a_{1,k}^{(i_2)}1\big)dt - \int_0^{NT} r(t)s\big(t, \underline{u}^{(j_2)}, u_k = a_{1,k}^{(j_2)}0\big)dt$$

In the LLR equations, $\underline{u}^{(i)}$ for $i \in \{i_1, i_2, j_1, j_2\}$, denote the source symbol sequences that achieve the respective maximums and $\{a_{1,k}^{(i)}, a_{2,k}^{(i)}\}$ denote the bit values associated with the $k^{th}$ symbol $u_k$ of sequence $\underline{u}^{(i)}$. As is apparent from the approximate LLR equations, the approximate soft bit metrics $\rho_{1,k}$ and $\rho_{2,k}$ are free of the implementation difficulties associated with the optimum soft bit metrics, and the respective bit decisions on $a_{1,k}$ and $a_{2,k}$, that are readily usable for hard-decision decoding, can be obtained simply by taking their algebraic signs. More importantly, as is also apparent from the approximate LLR equations, each of the four integrals defining the approximate soft bit metrics $\rho_{1,k}$ and $\rho_{2,k}$ can be efficiently computed by applying the conventional MLSE Viterbi algorithm over a constructed state-constrained trellis. This is due to the fact that, as the conventional MLSE Viterbi algorithm seeks maximum signal correlation over each of these four constrained trellises, the corresponding integral coincides exactly with the resulting survivor path metric. Referring to FIG. 2, the QSBM generator 32 applies the conventional MLSE Viterbi algorithm over two pairs of state-constrained trellises, that is, an MSB-constrained pair consisting of the MSB-1 and MSB-0 trellises respectively shown in FIG. 3A and FIG. 3B, and an LSB-constrained pair consisting of the LSB-1 and LSB-0 trellises respectively shown in FIG. 3C and FIG. 3D. While the MSB-1 trellis 48 effectively computes the first integral of the $\rho_{1,k}$ equation, the MSB-0 trellis 50 concurrently computes the second integral of the $\rho_{1,k}$ equation. These two MSB-constrained integrals are subtracted at the adder 56 to yield the approximate soft bit metric $\rho_{1,k}$, thus generating the $\rho_{MSB}$ bit-metric stream 58. In a similar manner, the QSBM generator 32 generates the $\rho_{LSB}$ bit-metric stream 62 by applying the conventional MLSE Viterbi algorithm over the LSB-1 trellis 52 and LSB-0 trellis 54 and differencing the resulting surviving path metrics at the adder 60 to form the approximate soft bit metric $\rho_{2,k}$. As already mentioned, the two bit-metric streams $\rho_{MSB}$ and $\rho_{LSB}$, together constituting a single stream of quaternary data estimates $\hat{d}_n$ 64, provide alternating soft bit metrics to the convolutional decoder 25.

Referring specifically to FIGS. 3A, 3B, 3C and 3D, both the MSB-constrained and LSB-constrained trellises have the same transitional structure as that of an unconstrained MLSE trellis over the observation window $0 \leq t < nT$. Over the observation window $nT \leq t < (n+1)T$, an MSB=1 constraint is imposed on the state symbol $u_n$ in the MSB-1 trellis, whereas an MSB=0 constraint is imposed in the MSB-0 trellis. Similarly, an LSB=1 constraint is imposed in the LSB-1 trellis, and an LSB=0 constraint is imposed in the LSB-0 trellis. Each of these four constrained trellises reappears as an unconstrained MLSE trellis at time $t=(n+1)T$ and continues to propagate in the same unconstrained manner for another $(N_d-1)$ symbol intervals, where $N_d \geq 1$ is a design parameter. The parameter $N_d$ provides an avenue for performance optimization at the expense of introducing a decision delay of $N_d T$ seconds. In addition to being able to generate soft bit metrics that permit soft-decision decoding, another important processing advantage of the QSBM demodulator 24 is that, unlike conventional quaternary CPM demodulator, there is no need to store the survivor path states when applying the conventional MLSE Viterbi algorithm over each of the four constrained trellises because only the survivor path metrics need to be updated. Also, because the unconstrained MLSE trellis portion over the observation window $0 \leq t < nT$ is common to all four constrained trellises, the associated add-and-compare processing needs only to be performed once. In general, the choice of the decision delay parameter $N_d$ depends on the projected bit error rate (BER) at the decoder input, which in turn depends on the error correction code selected for the coded communication system and the overall objective BER. As an example, for a typical projected decoder input error rate of $10^{-2}$ using a convolutional-coded quaternary GMSK signal with BT=1/3=1/L and h=1/4, a choice of $N_d < 3$ results in significant performance degradation with respect to the conventional MLSE demodulator, whereas a choice of $N_d > 3$ brings only negligible performance improvement with respect to the optimal choice of $N_d = 3$.

Figure 4:
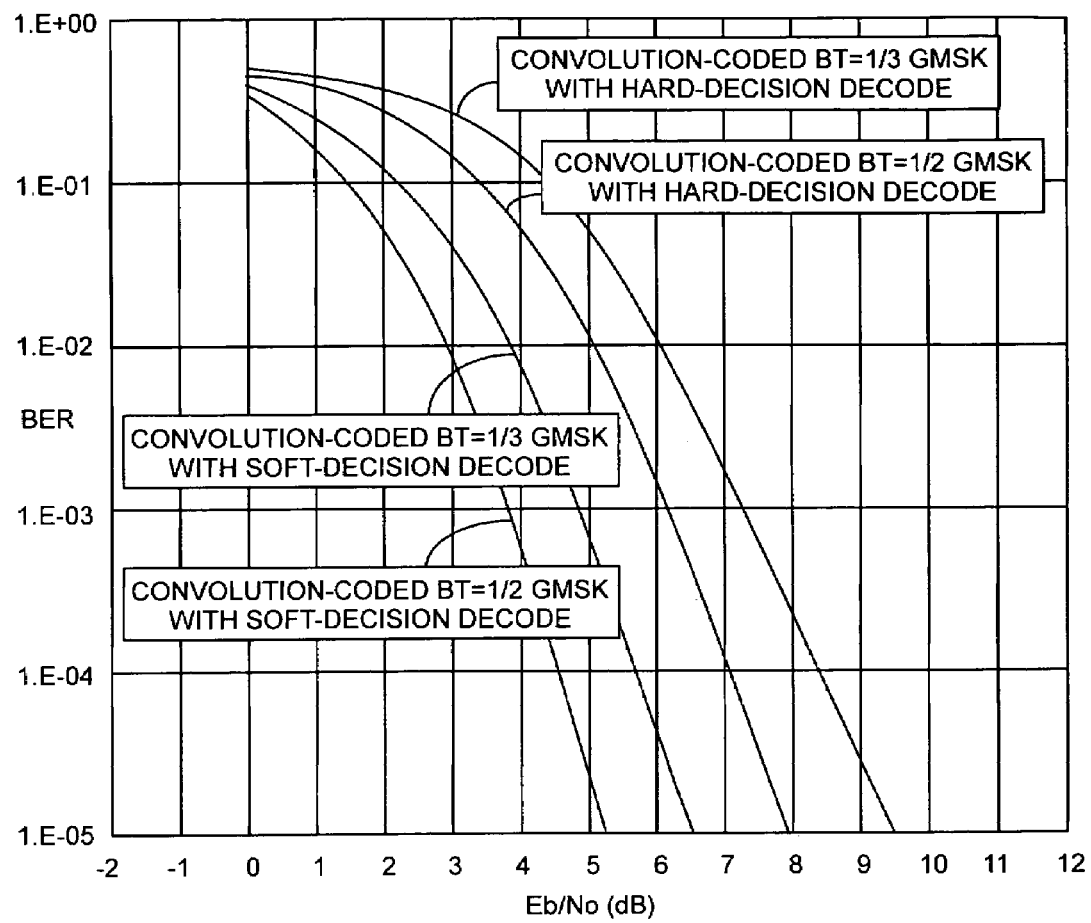
FIG. 4 is a performance graph of a convolutional-coded quaternary GMSK system using the QSBM demodulator.

Referring to all Figures, and particularly to FIG. 4 of performance data, the QSBM demodulator 24 provides improved performance with respect to the conventional MLSE demodulator even when using only three matched filters in the filter bank 28 for a convolutional-coded GMSK communication system with a BT value of 1/3 or 1/2. The error correction code used by the encoder 27 and decoder 25 may be a rate-1/2 non-systematic non-recursive convolution code with constraint length 7 and code generators $\{133,171\}$ in octal format. The transmitter 10 may include a 128×128 block interleaver between the convolutional encoder 27 and the quaternary precoder 12, and the receiver 20 would include a corresponding deinterleaver between the QSBM generator 32 and the sixty-four-state maximum likelihood convolutional decoder 25. The convolutional decoder 25 performs either soft- or hard-decision decoding depending upon whether the soft bit metrics $\rho_{1,k}$ and $\rho_{2,k}$ or their algebraic signs are outputted from the QSBM generator 32. The decision delay parameter $N_d$ is set at the optimal choice of $N_d = 3$, and the path length used by the convolutional decoder 25 is set at 32. The channel 18 is AWGN with no extraneous interference. The performance advantage of the proposed QSBM demodulator with respect to the conventional MLSE demodulator is measured by the difference in required SNR between using soft- or hard-decision decoding. With BT=1/3, for example, the proposed QSBM demodulator has a power advantage of about 3.1 dB over the conventional MLSE demodulator in achieving an overall objective BER of $10^{-5}$. Similar performance advantage is observed for BT=1/2. Here, the power advantage of using the proposed QSBM demodulator is about 2.7 dB.

The invention is directed to a soft bit metric demodulator for quaternary CPM signals. The QSBM demodulator 24 is computationally as efficient as the conventional quaternary CPM demodulator, yet requires significantly fewer storage elements as it needs not store the survivor path states when generating the soft bit metrics using the QSBM generator 32. The QSBM demodulator 24 can be applied to a convolutional-coded quaternary GMSK communication system with BT values of 1/3 and 1/2, resulting in a respective power advantage of 3.1 dB and 2.7 dB over the conventional quaternary CPM demodulator. The preferred QSBM demodulator 24 uses three matched filters in the filter bank 28, but can be extended to a larger set of matched filters. The QSBM demodulator 24 is directly applicable to all precoded quaternary CPM signals. The quaternary data precoder 12 embedded in the quaternary GMSK modulator 10 is directly applicable to providing the necessary data precoding for general quaternary CPM signals. Those skilled in the art can make enhancements, improvements, and modifications to the invention, and these enhancements, improvements, and modifications may nonetheless fall within the spirit and scope of the following claims.

What is claimed is:

1. A receiver for demodulating a received signal generated by a modulator providing quaternary precoding and quaternary continuous phase modulation of a binary bit sequence, the receiver for providing an estimate of the bit sequence, the receiver comprises a demodulator comprising,
   a bank of filters for providing a matched filter response of pulse-amplitude modulation components of the received signal, the received signal being a quaternary continuous phase modulation signal,
   a sampler for sampling the matched filter response for providing samples, and
   a generator for generating log-likelihood-ratio-based soft bit metrics $\rho_1$ and $\rho_2$ from the samples using maximum likelihood sequence estimation Viterbi algorithm forming the estimate of the bit sequence, the received signal being a waveform indicating a sequence of quaternary symbols with each pair of bits in the bit sequence forming a quaternary symbol,
   wherein,
   the generator outputs $\rho_1$ and $\rho_2$ are respectively, $$\rho_{1,k} = \int_0^{NT} r(t)s(t, \underline{u}^{(i_1)}, u_k = 1a_{2,k}^{(i_1)})dt - \int_0^{NT} r(t)s(t, \underline{u}^{(j_1)}, u_k = 0a_{2,k}^{(j_1)})dt$$

and $$\rho_{2,k} = \int_0^{NT} r(t)s(t, \underline{u}^{(i_2)}, u_k = a_{1,k}^{(i_2)}1)dt - \int_0^{NT} r(t)s(t, \underline{u}^{(j_2)}, u_k = a_{1,k}^{(j_2)}0)dt$$

where $u^{(i)}$ for $i \in \{i_1, i_2, j_1, j_2\}$ are quaternary data sequences achieving the respective maximums and $\{a^{(i)}_{1,k}, a^{(i)}_{2,k}\}$ are bit values associated with the quaternary data sequences for an index k, NT being an observation window where N is a number of symbols and T is a symbol time, r(t) being the received signal, S( ) being a waveform corresponding to a path in a constraint trellis.

2. A receiver for demodulating a received signal generated by a modulator providing quaternary precoding and quaternary continuous phase modulation of a binary bit sequence, the receiver for providing an estimate of the bit sequence, the receiver comprises a demodulator comprising,
   a bank of filters for providing a matched filter response of pulse-amplitude modulation components of the received signal, the received signal being a quaternary continuous phase modulation signal,
   a sampler for sampling the matched filter response for providing samples, and
   a generator for generating log-likelihood-ratio-based soft bit metrics $\rho_1$ and $\rho_2$ from the samples using maximum likelihood sequence estimation Viterbi algorithm forming the estimate of the bit sequence, the received signal being a waveform indicating a sequence of quaternary symbols with each pair of bits in the bit sequence forming a quaternary symbol,
   wherein,
   the generator comprises,
   an MSB-1 trellis for computing $$\int_0^{NT} r(t)s(t, \underline{u}^{(i_1)}, u_k = 1a_{2,k}^{(i_1)})dt$$

using maximum likelihood sequence estimation Viterbi algorithm,
   an MSB-0 trellis for computing $$\int_0^{NT} r(t)s(t, \underline{u}^{(j_1)}, u_k = 0a_{2,k}^{(j_1)})dt$$

using maximum likelihood sequence estimation Viterbi algorithm,
   an LSB-1 trellis for computing $$\int_0^{NT} r(t)s(t, \underline{u}^{(i_2)}, u_k = a_{1,k}^{(i_2)}1)dt$$

using maximum likelihood sequence estimation Viterbi algorithm, and
   an LSB-0 trellis for computing $$\int_0^{NT} r(t)s(t, \underline{u}^{(j_2)}, u_k = a_{1,k}^{(j_2)}0)dt$$

using maximum likelihood sequence estimation Viterbi algorithm,
   an MSB adder for forming $\rho_1$ and providing the MSB metric, and
   an LSB adder for forming $\rho_2$ and providing the LSB metric, NT being an observation window where N is a number of symbols and T is a symbol time, r(t) being the received signal, S( ) being a waveform corresponding to a path in a constraint trellis.

3. The receiver of claim 2 wherein,
   the continuous phase modulation has a bandwidth-time product of 1/3.

4. The receiver of claim 2 wherein,
   the continuous phase modulation has a bandwidth-time product of 1/2.

5. The receiver of claim 2 wherein,
   the continuous phase modulation has a modulation index of 1/4.

6. The receiver of claim 2 wherein,
   the binary bit sequence is convolutionally encoded during modulation and the generator output is convolutionally decoded for providing the estimate of the binary bit sequence.

7. The receiver of claim 2 wherein,
   the received signal is modeled by a pulse-amplitude modulation representation, and the bank of filters provides matched-filtering for the pulse-amplitude modulation components of the received signal.

8. The receiver of claim 2 wherein the modulator provides up-conversion of the transmit baseband signal communicated through a channel and received as the received signal, the receiver further comprising,
a downconverter for downconverting the received signal.

9. The receiver of claim 2 wherein,
two bits of the binary bit sequence are precoded into a sequence of quaternary symbols.

10. The receiver of claim 2 wherein,
the generator comprises four trellises for computing the soft bit metrics $\rho_1$ and $\rho_2$.

11. The receiver of claim 2 wherein,
the demodulator is a quaternary Gaussian minimum shift keying demodulator.

12. The receiver of claim 2 wherein,
a subset of matched filters are used in the bank of filters for filtering a corresponding subset of pulse-amplitude modulation components of the received signal.

* * * * *